US009646341B2

(12) United States Patent
Werner et al.

(10) Patent No.: US 9,646,341 B2
(45) Date of Patent: May 9, 2017

(54) INTERACTIVE MULTIMEDIA SHOWROOM DISPLAY FOR PLUMBING FIXTURES AND PRODUCTS

(71) Applicant: Globe Union Group, Inc., Woodridge, IL (US)

(72) Inventors: Michael Werner, Woodridge, IL (US); Sharon Overby, Woodridge, IL (US); Edward Detgen, Woodridge, IL (US); Brian Fiala, Woodridge, IL (US); Kevin McJoynt, Woodridge, IL (US); Mark Abbas, Atlanta, GA (US); James Stoklosa, Atlanta, GA (US); Christopher Livaudais, Atlanta, GA (US); Florian Vollmer, Atlanta, GA (US); Sandjar Kozubaev, Atlanta, GA (US)

(73) Assignee: Danze, Inc., Woodridge, IL (US)

( * ) Notice: Subject to any disclaimer, the term of this patent is extended or adjusted under 35 U.S.C. 154(b) by 461 days.

(21) Appl. No.: 14/305,266

(22) Filed: Jun. 16, 2014

(65) Prior Publication Data

US 2015/0073946 A1 Mar. 12, 2015

Related U.S. Application Data

(60) Provisional application No. 61/836,856, filed on Jun. 19, 2013.

(51) Int. Cl.
*G06Q 30/00* (2012.01)
*G06Q 30/06* (2012.01)
*A47F 1/00* (2006.01)

(52) U.S. Cl.
CPC ........... *G06Q 30/0643* (2013.01); *A47F 1/00* (2013.01)

(58) Field of Classification Search
CPC ................................ G06Q 30/08; A47F 1/00
USPC ............................................. 705/26.1–27.2
See application file for complete search history.

(56) References Cited

U.S. PATENT DOCUMENTS

| 6,561,365 | B2 * | 5/2003 | Bustos | ................. | A47F 5/0018 |
| | | | | | 211/187 |
| 2007/0182555 | A1 * | 8/2007 | Walker | ................ | G07G 1/0036 |
| | | | | | 340/572.1 |

OTHER PUBLICATIONS

"Kitchen, Shower, Bath, Lighting Series Brochure." Walls+Forms Information. Apr. 27, 2011. www.wallsforms.com.*

* cited by examiner

*Primary Examiner* — Matthew Zimmerman
*Assistant Examiner* — Katherine O'Sullivan
(74) *Attorney, Agent, or Firm* — Nancy R. Gamburd; Gamburd Law Group LLC

(57) ABSTRACT

An exemplary display system is disclosed, which includes a display wall having a plurality of slots; a plurality of removable shelves, each removable shelf insertable into a slot of the plurality of slots; a plurality of unique identifiers, each unique identifier coupled to a corresponding removable shelf; a fixed shelf having an embedded or attached sensor; and a user-interactive visual display. Various systems display plumbing fixtures. In exemplary embodiments, the unique identifiers are implemented using RFID tags.

20 Claims, 7 Drawing Sheets though fixtures. Also for example, each unique identifier may be an RFID tag and the embedded or attached sensor may be an RFID sensor. Also for example, each unique identifier may be a bar code or a QR code and the embedded or attached sensor may be a bar code reader or a QR code reader.

INTERACTIVE MULTIMEDIA SHOWROOM DISPLAY FOR PLUMBING FIXTURES AND PRODUCTS

CROSS-REFERENCE TO A RELATED APPLICATION

This application is a nonprovisional and claims the benefit of and priority to U.S. Provisional Patent Application No. 61/836,856, filed Jun. 19, 2013, inventors Michael Werner et al., titled "Interactive Multimedia Showroom Display For Plumbing Fixtures and Products", which is commonly assigned herewith, and all of which is hereby incorporated herein by reference in its entirety with the same full force and effect as if set forth in its entirety herein.

FIELD OF THE INVENTION

The present invention generally relates to product displays, and more particularly, relates to an interactive, multimedia showroom display for plumbing fixtures and products.

BACKGROUND OF THE INVENTION

Typical showroom or other retail displays for plumbing fixtures are generally problematic for users and potential purchasers. Plumbing fixtures are typically difficult to remove from a display wall, and doing so generally does not provide any additional information to the consumer. In addition, typical displays do not show or display every fixture in many different settings, such as differently configured kitchens and baths, and as a result, it may be difficult for a consumer to visualize how a selected plumbing fixture would look and be used in a selected setting, such as the consumer's home.

As a result, a need remains for an interactive, multimedia showroom display for plumbing fixtures and products. Such a display should provide comparative ease of use for and interaction with a consumer, should provide product information and specifications, and should enable a consumer to visualize how a selected plumbing fixture would look and be used in a selected setting, such as the consumer's home.

SUMMARY OF THE INVENTION

The exemplary embodiments provide an interactive, multimedia showroom display for plumbing fixtures and products. Such a display provides comparative ease of use for and interaction with a consumer, provides product information and specifications, and enables a consumer to visualize how a selected plumbing fixture would look and be used in a selected setting, such as the consumer's home.

An exemplary or representative display system embodiment is disclosed which comprises: a display wall having a plurality of slots; a plurality of removable shelves, each removable shelf insertable into a slot of the plurality of slots; a plurality of unique identifiers, each unique identifier coupled to a corresponding removable shelf; a fixed shelf having an embedded or attached sensor; and a user-interactive visual display. An exemplary or representative display system embodiment also may further comprise a plurality of different products, each product coupled to a removable shelf.

In various exemplary or representative embodiments, each unique identifier corresponds to a selected product of the plurality of products. For example, the plurality of different products may be a plurality of different plumbing fixtures. Also for example, each unique identifier may be an RFID tag and the embedded or attached sensor may be an RFID sensor. Also for example, each unique identifier may be a bar code or a QR code and the embedded or attached sensor may be a bar code reader or a QR code reader.

In various exemplary or representative embodiments, the user-interactive visual display is a touch screen display. Also in various exemplary or representative embodiments, each slot is spring-loaded. Also for example, the plurality of slots may have a staggered configuration.

An exemplary or representative display system embodiment also may further comprise: a memory storing product information; and a processor coupled to the memory, the processor to generate data for display on the user-interactive visual display corresponding to a selected product corresponding to a selected unique identifier sensed by the sensor. For example, the generated data may be a product specification for the selected product. Also for example, the generated data may be a video for the selected product, or a product line for the selected product, or a plurality of finishes for the selected product. Also for example, the generated data may be for a visual display showing use of the selected product in a selected kitchen or bath environment.

An exemplary or representative display system embodiment also may further comprise a network input-output interface providing a network coupling for updating the product information stored in the memory. In an exemplary or representative embodiment, the product information may be stored as a database.

An exemplary or representative display system embodiment also may further comprise a manufacturer logo floating display.

Another exemplary or representative display system embodiment also may further comprise: a display wall having a plurality of spring-loaded slots; a plurality of removable shelves, each removable shelf insertable into a slot of the plurality of slots; a plurality of RFID tags, each RFID tag coupled to a corresponding removable shelf; a fixed shelf having an embedded or attached RFID sensor; and a user-interactive visual display.

Another exemplary or representative display system embodiment also may further comprise: a display wall having a plurality of spring-loaded slots; a plurality of removable shelves, each removable shelf insertable into a slot of the plurality of slots; a plurality of RFID tags, each RFID tag coupled to a corresponding removable shelf; a fixed shelf having an embedded or attached RFID sensor; a user-interactive visual display; a memory storing product information; and a processor coupled to the memory, the processor to generate data for display on the user-interactive visual display corresponding to a selected product corresponding to a selected RFID tag sensed by the RFID sensor.

Numerous other advantages and features of the present disclosure will become readily apparent from the following detailed description of the subject matter described in this specification and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

Figure (or "FIG.") 1 is a diagram illustrating an exploded view of an exemplary or representative interactive multimedia display system embodiment.

Figure 1:
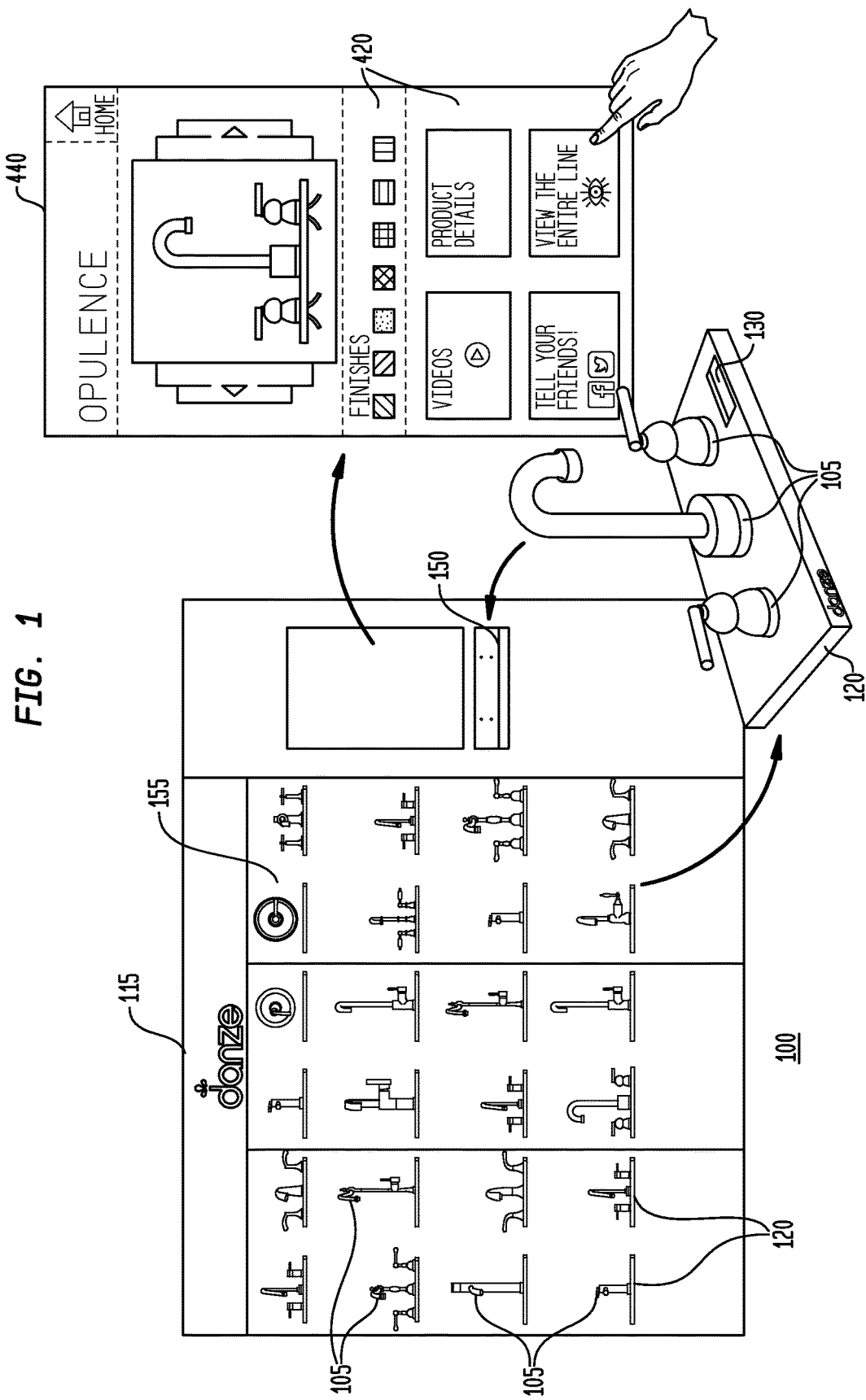

Figure (or "FIG.") 2 is a diagram illustrating a first perspective view of a first exemplary or representative interactive multimedia display system embodiment.

Figure (or "FIG.") 3 is a diagram illustrating a first front view of the first exemplary or representative interactive multimedia display system embodiment.

Figure (or "FIG.") 4 is a diagram illustrating a second perspective view of the first exemplary or representative interactive multimedia display system embodiment.

Figure (or "FIG.") 5 is a diagram illustrating a third perspective view of the first exemplary or representative interactive multimedia display system embodiment.

Figure (or "FIG.") 6 is a diagram illustrating a front view of a second exemplary or representative interactive multimedia display system embodiment.

Figure (or "FIG.") 7 is a block diagram illustrating an exemplary or representative user interactive display apparatus embodiment for a display system.

DETAILED DESCRIPTION OF REPRESENTATIVE EMBODIMENTS

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 2:
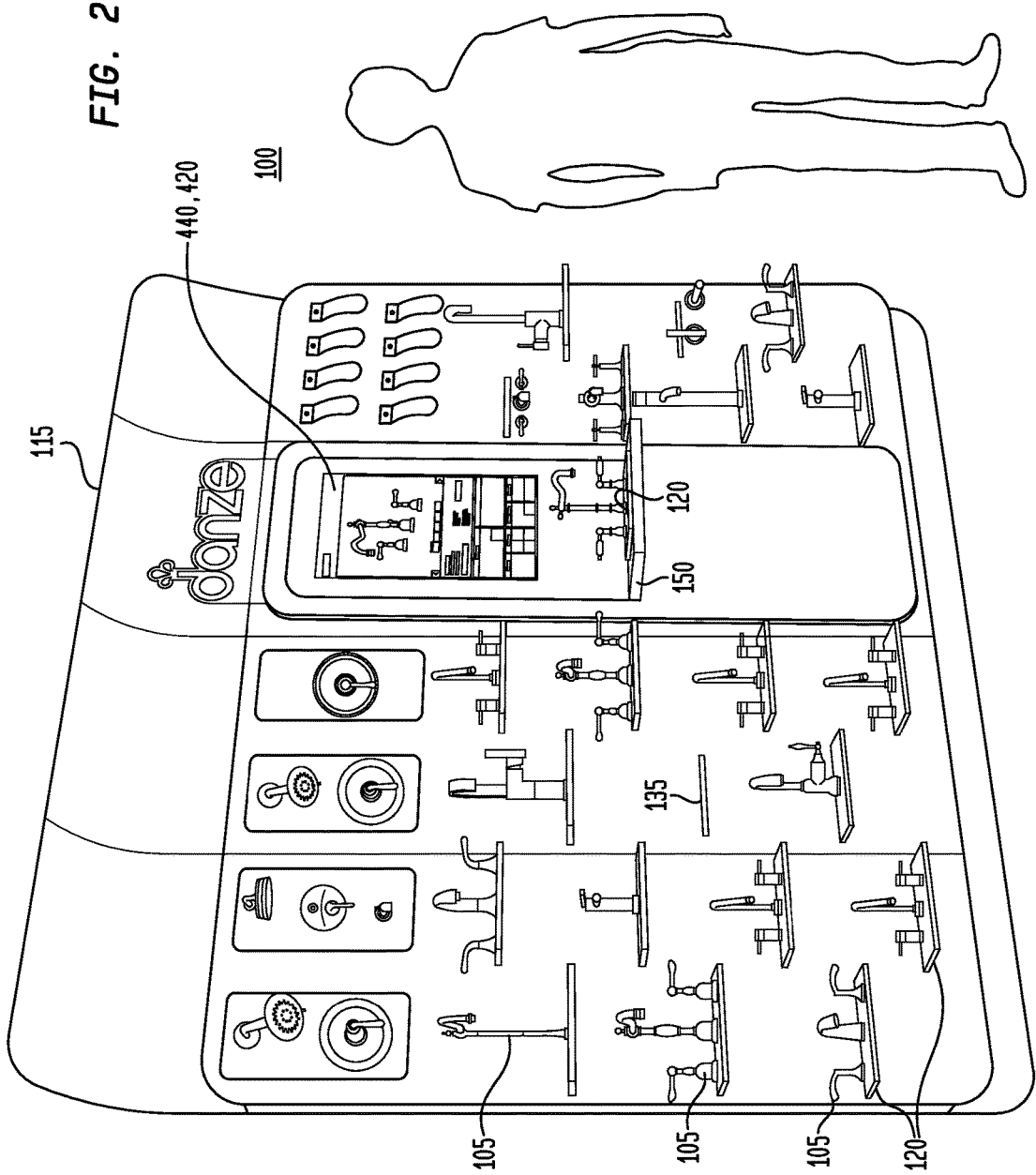
Figure 3:
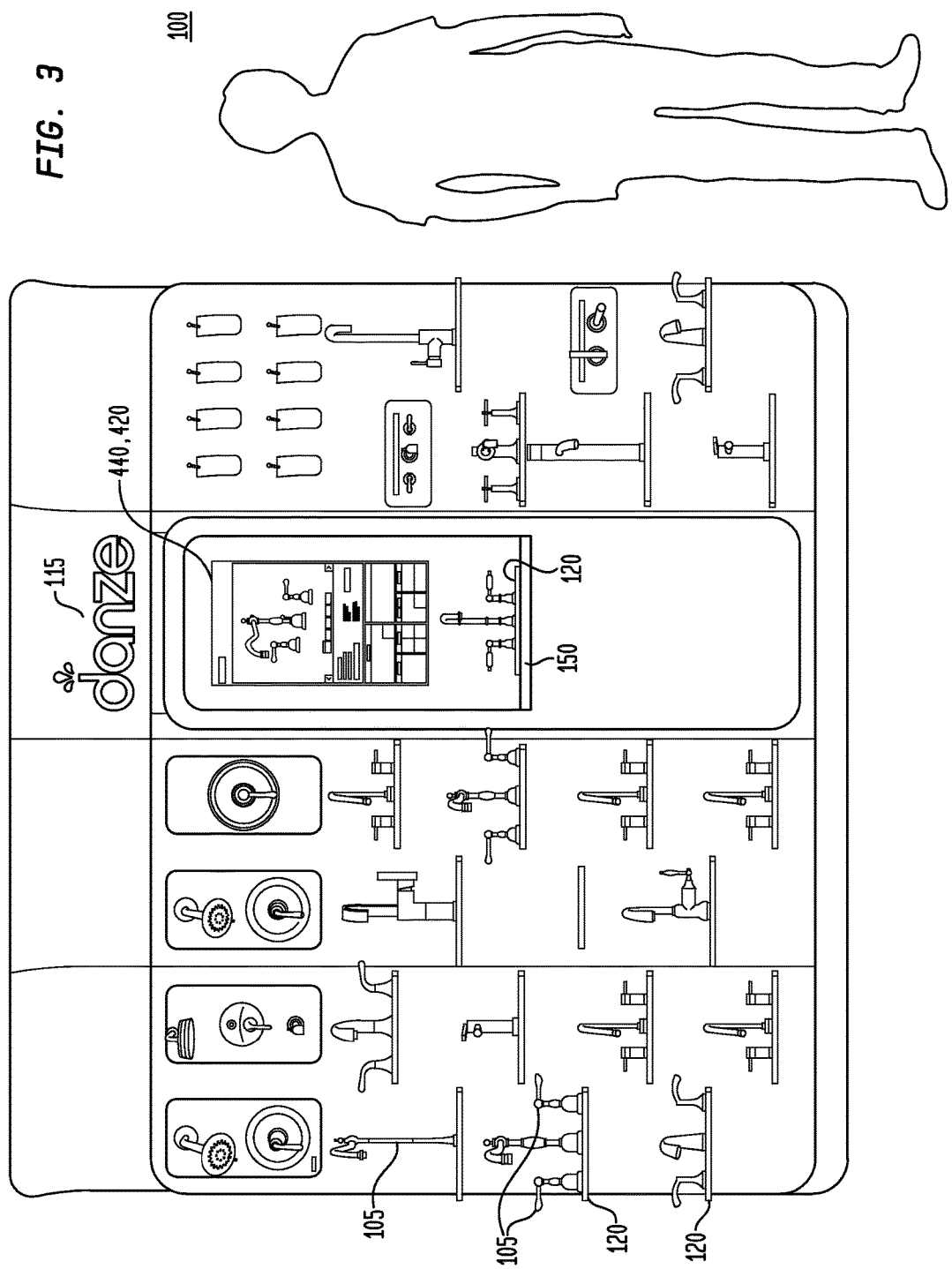
Figure 4:
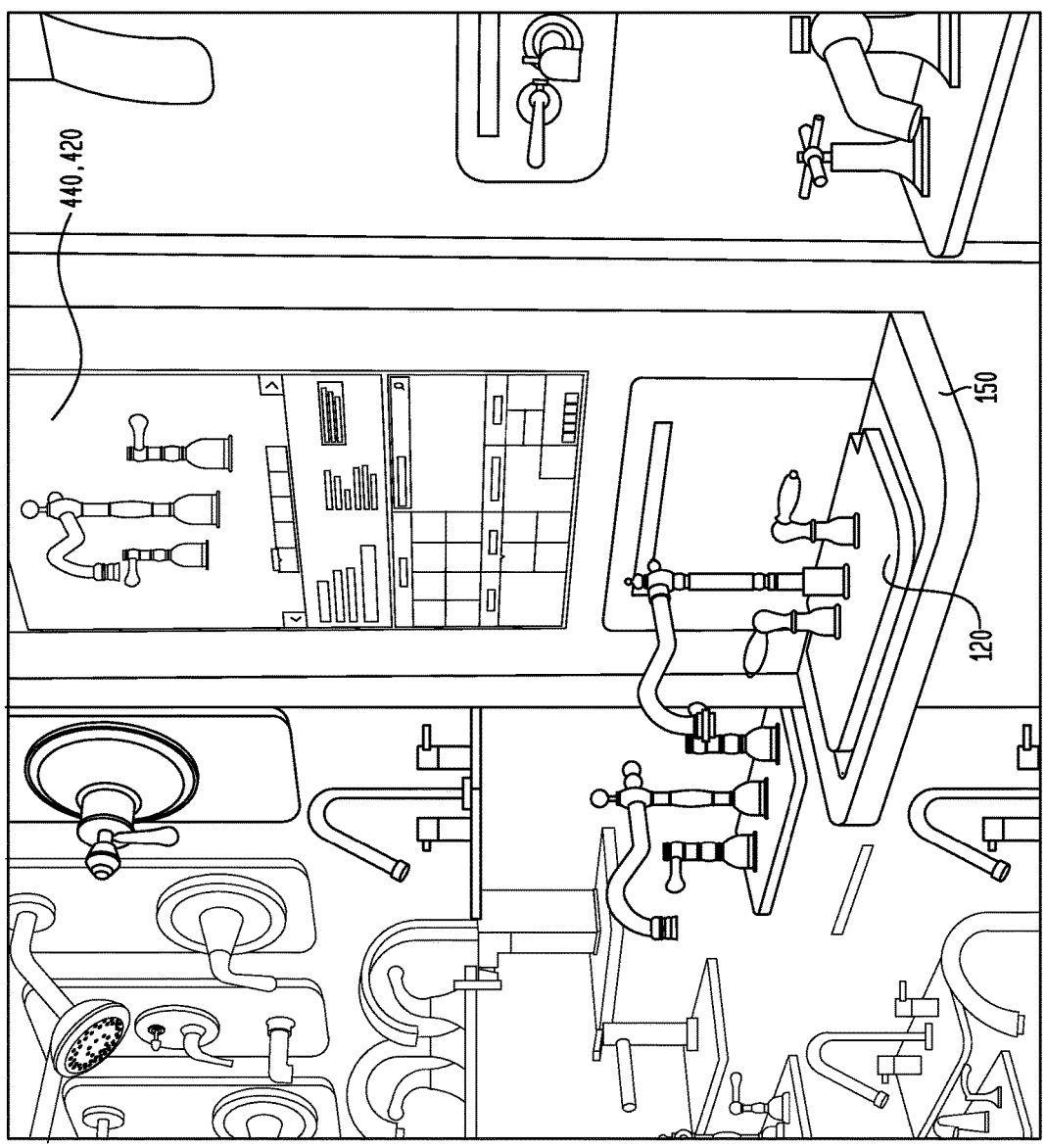
Figure 5:
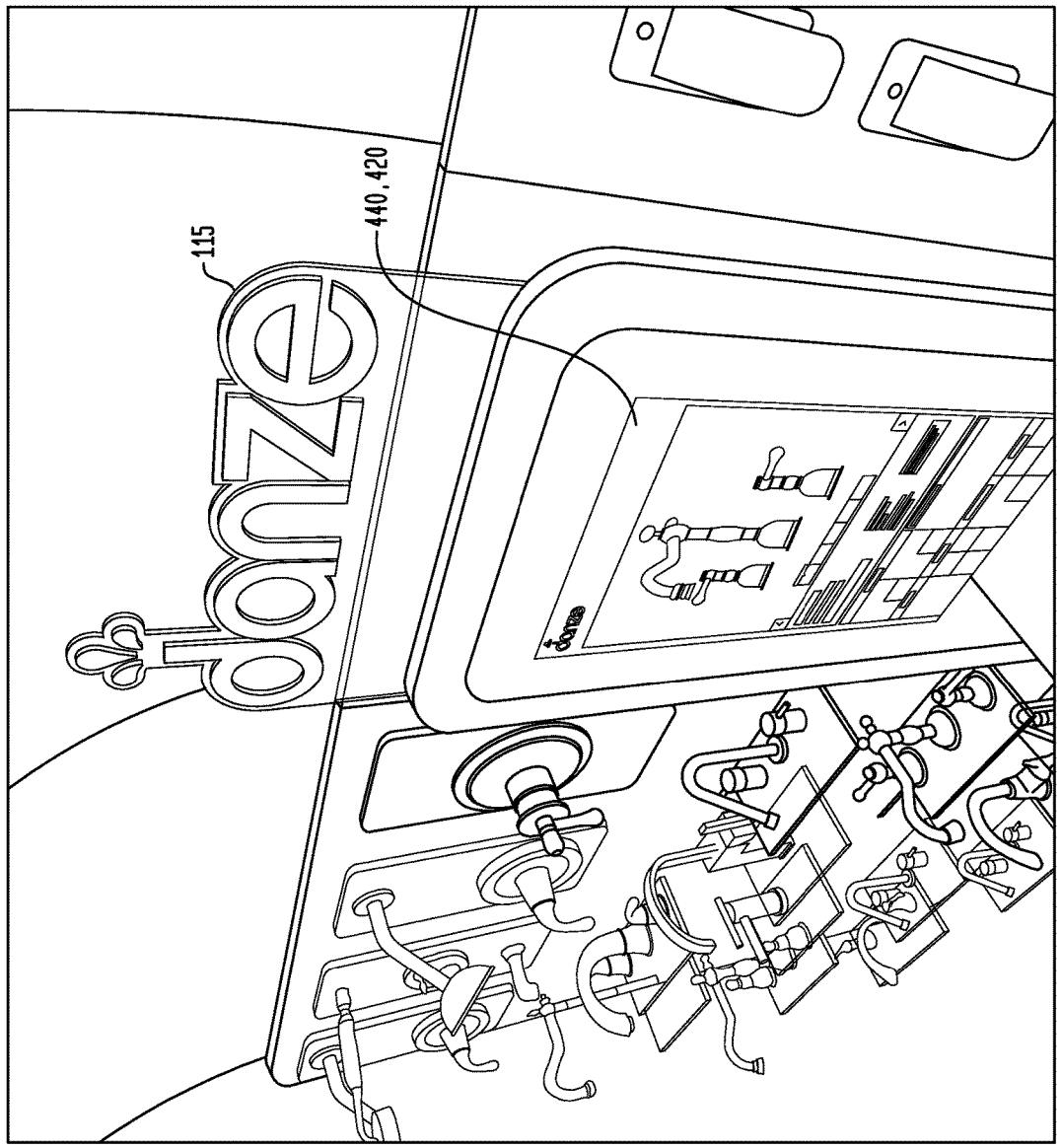
Figure 6:
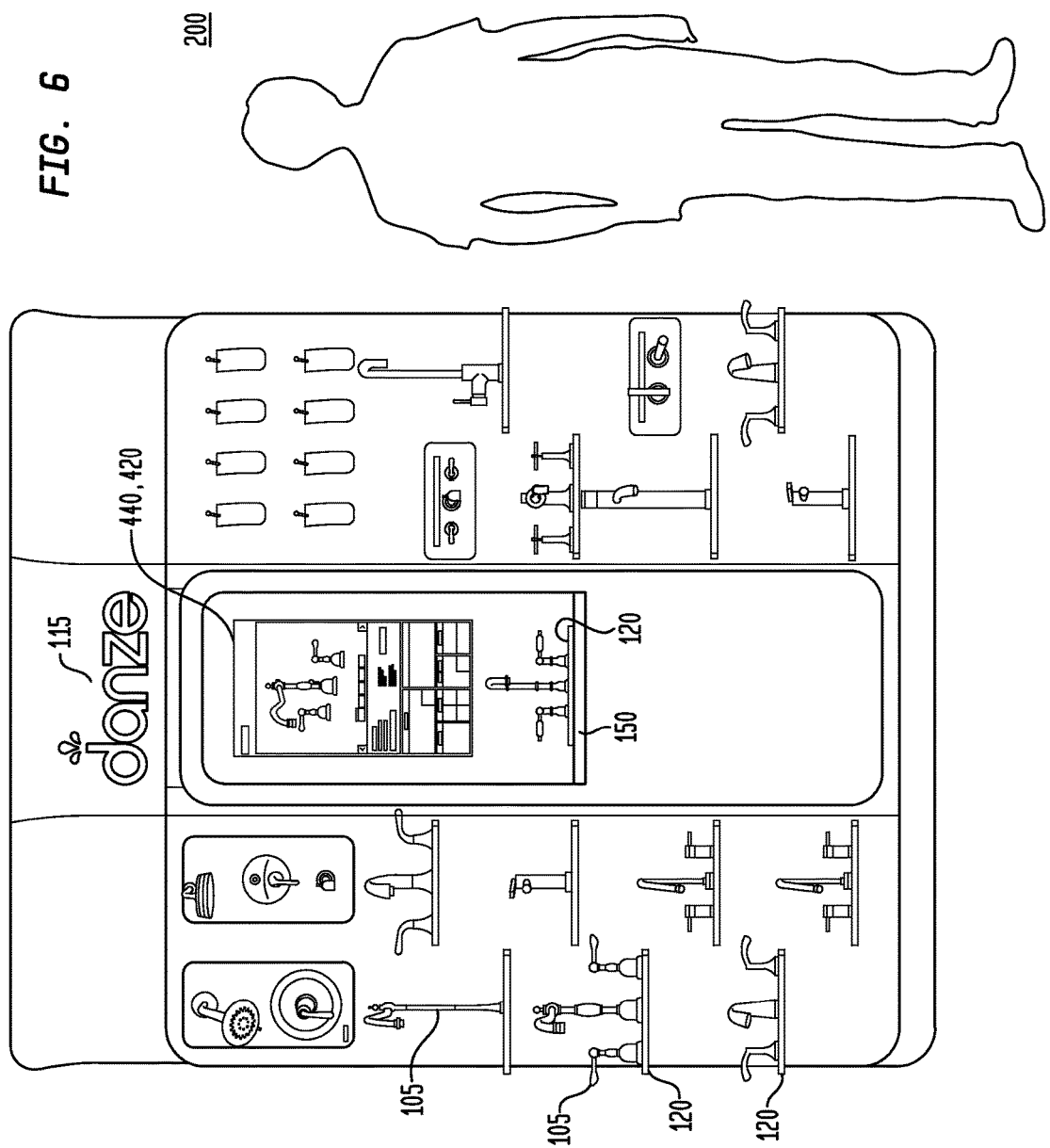

FIG. 1 is a diagram illustrating an exploded view of an exemplary or representative interactive multimedia display system 100 embodiment. FIG. 2 is a diagram illustrating a first perspective view of a first exemplary or representative interactive multimedia display system 100 embodiment. FIG. 3 is a diagram illustrating a first front view of the first exemplary or representative interactive multimedia display system 100 embodiment. FIG. 4 is a diagram illustrating a second perspective view of the first exemplary or representative interactive multimedia display system 100 embodiment. FIG. 5 is a diagram illustrating a third perspective view of the first exemplary or representative interactive multimedia display system 100 embodiment. FIG. 6 is a diagram illustrating a front view of a second exemplary or representative interactive multimedia display system 200 embodiment.

Referring to FIGS. 1-6, an exemplary or representative interactive multimedia display system 100, 200 embodiment comprises one or more plumbing fixtures 105, each of which is disposed or arranged on a removable shelf 120 which includes an attached or embedded RFID tag 130 or contains some other encoding (such as a bar code or QR code) which may be read by a sensor 460 (illustrated in FIG. 7) which is attached or embedded in the "smart" shelf 150, with corresponding product information displayed on an electronic display 440, 420, such as a touch screen LCD or LED display, for example and without limitation. Each different type of plumbing fixture 105 on a removable shelf 120 has a corresponding RFID tag 130 having a unique identification or other identifier, so that when a user removes a removable shelf 120 (having an attached plumbing fixture 105) from the wall 155 and places the selected removable shelf 120 (having an attached plumbing fixture 105) on the smart shelf 150, the sensor 460 will read the unique identification of the RFID tag 130 or other encoding, and display corresponding information on the display 440, such as activating digital content specific to that particular product.

As illustrated, each removable shelf 120 is removably insertable into a corresponding slot 135 in the wall 115 of the system 100, 200, including through a spring-loaded mechanism (not separately illustrated). This allows for the user to readily handle the selected product and selectively remove a product from the wall 115, to easily re-insert the removable shelf 120 back into the corresponding slot 135, and for ease of use of the display system 100, 200. In various exemplary embodiments, the removable shelf 120 is implemented as a clear acrylic base. As illustrated, the removable shelves 120 are mounted in a staggered fashion, to be visually dynamic and to facilitate display and eliminate crowding of a plurality of different product styles, which may differ in height, for example and without limitation. A manufacturer or other company brand (115) may also be included as part of the display system 100, 200, such as the Danze (115) logo illustrated as a floating logo in FIG. 5. Not separately illustrated, various types of display lighting may also be included, such as through LED lighting strips in various locations within the system 100, 200.

Also as illustrated, the system 100 is interactive with a user, via user I/O interface 420, illustrated as a touch screen user interface in the various Figures. As illustrated, a user may select various features to be displayed on the display 440, such as finishes, videos, product details, the entire product line, etc., for example and without limitation. In addition, also as illustrated, a user may scroll through various product images, typically displaying the selected product in various environments, such as a plurality of kitchens or a plurality of baths, also for example and without limitation. As a result, the system 100 provides a seamless, intuitive interactive experience for the consumer or other user, and seamlessly integrates the product (105) and digital experience like no other display in the plumbing industry, thereby reducing the complexity in the kitchen and bath renovation and fixture selection process. It also facilitates display of a mixture of faucet styles and mounting methods, for example and without limitation.

The systems 100, 200 are also flexible, allowing accommodation and management of regional preferences for content and styles of plumbing fixture 105. The various systems 100, 200 are modular and scalable, such as illustrated in FIG. 6, showing a comparatively smaller version of a system, illustrated as a second exemplary or representative interactive multimedia display system 200 embodiment, which is otherwise identical to and includes all of the features described above for a system 100.

The various systems 100, 200 allow for delivery of updated and relevant content for display via display 440.

The systems 100, 200 are robust and retail-hardened to withstand a showroom environment for extended periods of time. The systems 100, 200 also allow remote power management, and user-interaction may also be captured along with other relevant data, such as user navigation of the various features and other content displayed.

Figure 7:
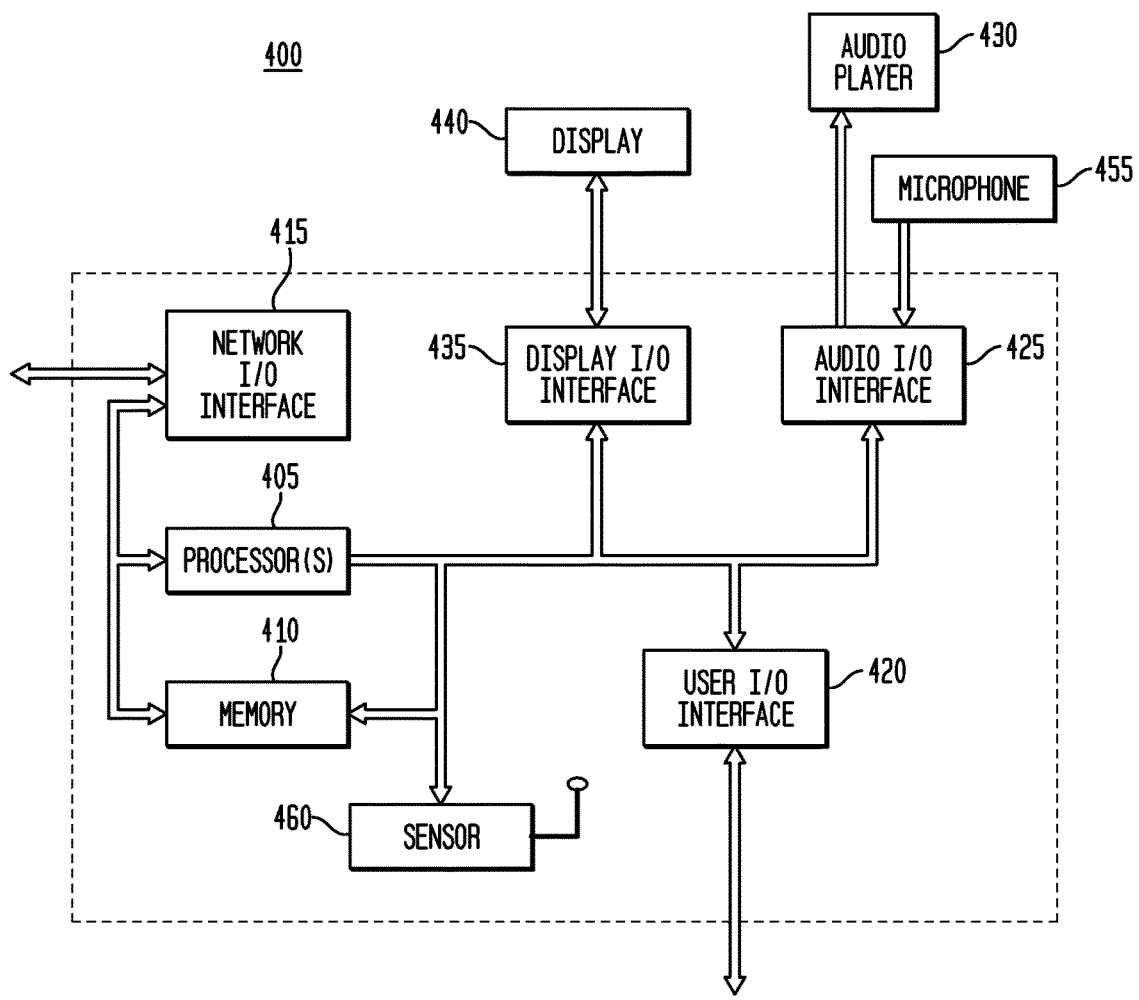

FIG. 7 is a block diagram illustrating an exemplary or representative user interactive display apparatus 400 embodiment for a display system 100, 200 embodiment. The operations described in this specification may be implemented as operations performed by a data processing apparatus on data stored on one or more computer-readable storage devices or received from other sources. Referring to FIG. 7, as illustrated, the exemplary interactive display apparatus 400 may be implemented or embodied in a plurality of ways such as, for example and without limitation, within a single data processing apparatus or among a plurality of networked data processing apparatus, such as within a computer, a server, a tablet computing device, a mobile telephone or smartphone, or any other type of data processing device.

The interactive display apparatus 400 may be coupled, via a network I/O interface 415, to any network of any type of kind, using any medium such as wired, optical, or wireless, using any current or future protocols, such as Internet Protocol ("IP"), Transmission Control Protocol ("TCP") (collectively with IP referred to as "TCP/IP"), which may further incorporate other current or future protocols, such as hypertext transfer protocol ("HTTP"), various email and file transfer protocols (e.g., SMTP, FTP), or other types of networks, such as the public switched telephone network ("PSTN"), cellular, GSM, EDGE, GPRS, Institute of Electrical and Electronic Engineers ("IEEE") 802.11, CDMA, WCDMA, or 3G, or any other network which provides for communication for data, voice or multimedia, for user input, selection, evaluation, reporting, media provision, and so on. The network, in turn, may be utilized to provide any type of communication between and among the other illustrated devices, and may be directly or indirectly coupled to any of a plurality of other devices for such internet, voice, multimedia or any other form of data communication, whether switched or routed, including without limitation router(s), wireless router(s), and server(s) of any type or kind (and which may be further coupled to database(s) (not separately illustrated), and so on. In various embodiments, the network I/O interface 415 is utilized to enable updated content for the interactive systems 100, 200.

For example, representative embodiments of the subject matter described in this specification may be implemented in a computing system that includes a back-end or a middleware component, such as a data or application server, or that includes a front-end component such as a client computer having an interactive graphical user interface or a Web browser, or any combination of one or more such back-end, middleware, or front-end components. The components of the system can be interconnected by any form or medium of digital data communication, such as a network or internet as a representative communication network (e.g., a local area network ("LAN") and a wide area network ("WAN"), an inter-network such as the Internet, and/or a peer-to-peer network. The apparatus 400 described below and the execution environment of system 100, 200 and/or apparatus 400 may utilize various different computing model infrastructures, such as web services, distributed computing and grid computing infrastructures, for example and without limitation.

FIG. 7 is a block diagram illustrating an exemplary or representative user interactive display apparatus embodiment for a display system. Such an apparatus 400 may be equivalently referred to as a system, such as when embodied as a computer or server, and claimed as such. Referring to FIG. 7, the exemplary apparatus 400 comprises one or more processor(s) 405, a network input/output ("I/O") interface 415, a memory 410 (which also may include one or more databases), and a sensor 460 (illustrated as a wireless sensor 460, such as to (interactively) read an RFID tag 130, but which also may be a bar code or QR code reader, for example and without limitation). One or more sensors 460 are typically embedded or attached to a smart shelf 120. Depending upon the selected embodiment, such as whether embodied in a computer or a server, the apparatus 400 may also include optional components such as a user input/output ("I/O") interface 420 (such as for coupling to a keyboard, computer mouse, or other user input device, not separately illustrated), an audio input/output interface 425 (e.g., for coupling to a microphone 455, to audio speakers or other audio player 430), a display interface or controller 435, and may also include a display 440, such as an LCD screen or mobile smartphone touch screen, such as for display of the various graphical user interfaces as illustrated in FIGS. 1-6. As illustrated in the various Figures, the display 440 and user input/output ("I/O") interface 420 are implemented and combined in a touch screen display for user interactivity and display of information. For example, server embodiments typically may not include these optional components; conversely, various computer embodiments are likely to include all of such optional components. The processor(s) 405, sensor(s) 460, network input/output ("I/O") interface 415, memory 410, user input/output ("I/O") interface 420, audio input/output interface 425, audio player 430, display interface or controller 435, and display 440, may be implemented or embodied as known or becomes known in the electronic arts, with various examples described in greater detail below. In addition, multiple apparatuses 400 may be utilized in a system 100, 200, such as a first apparatus 400 as a client device and a second apparatus 400 as a server, for example and without limitation.

A processor 405 may be implemented using any type of digital or analog electronic or other circuitry which is arranged, configured, designed, programmed or otherwise adapted to perform any portion of the functionality described herein, such as interactively displaying and responding to the user selections provided via RFID tag 130 and user I/O interface 420, for example. As the term processor is used herein, a processor 405 may include use of a single integrated circuit ("IC"), or may include use of a plurality of integrated circuits or other electronic components connected, arranged or grouped together, such as processors, controllers, microprocessors, digital signal processors ("DSPs"), parallel processors, multiple core processors, custom ICs, application specific integrated circuits ("ASICs"), field programmable gate arrays ("FPGAs"), adaptive computing ICs, discrete electronic components, and any associated memory (such as RAM, DRAM and ROM), and other ICs and components, whether analog or digital. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits or discrete electronic components which perform the functions discussed above and further discussed below, and may further include any associated memory, such as microprocessor memory or additional RAM, DRAM, SDRAM, SRAM, MRAM, ROM, FLASH, EPROM or E²PROM. A processor (such as processor 405), with any associated memory, may be arranged, adapted or configured (via programming, FPGA interconnection, or hard-wiring) to perform any portion of the functionality of the present disclosure, as described herein. For example, the methodology may be programmed and stored, in a processor 405 with its associated memory (and/or memory 410) and other equivalent components, as a set of program instructions or other code (or equivalent configuration or other program) for subsequent execution when the processor 405 is operative (i.e., powered on and functioning). Equivalently, when the processor 405 may implemented in whole or part as FPGAs, custom ICs and/or ASICs, the FPGAs, custom ICs or ASICs also may be designed, configured and/or hard-wired to implement any portion of the functionality of the present disclosure. For example, the processor 405 may be implemented as an arrangement of analog and/or digital circuits, controllers, microprocessors, DSPs and/or ASICs, collectively referred to as a "processor", which are respectively hard-wired, arranged, programmed, designed, adapted or configured to implement the user-interactive functionality of the present disclosure, including possibly in conjunction with a memory 410.

The operations described in this disclosure can be implemented as operations performed by a data processing apparatus on data stored on one or more machine-readable storage devices or on data received from other sources. Apparatus 400 is an example of a representative data processing apparatus. As utilized herein, the terminology "data processing apparatus" encompasses any and all kinds of apparatus, devices, and machines for processing data, including by way of example a programmable processor (405), a computer, a server, a system on a chip ("SOC"), or combinations of such devices. The apparatus 400 can also include code (such as executable code) that creates an execution environment for a data processing apparatus, or other program, such as processor 405 firmware, a protocol stack, a database (345) management system, an operating system, a cross-platform runtime environment, a virtual machine, and/or combinations thereof, which may be utilized in a computer 305, a server 315, or other data processing apparatus.

A memory 410 may be embodied as any type of data storage device, such as RAM, FLASH, DRAM, SDRAM, SRAM, MRAM, FeRAM, ROM, EPROM or E²PROM, and is utilized for data storage, and also may be utilized to store any program instructions or configurations which may be utilized by a processor 405. More specifically, the memory 410 may be embodied in any number of forms, including within any nontransitory, machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 405 or processor IC), whether volatile or non-volatile, whether removable or non-removable, including without limitation RAM, FLASH, DRAM, SDRAM, SRAM, MRAM, FeRAM, ROM, EPROM or E²PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 410 may store data in any way or configuration, including as various look up tables, parameters, coefficients, databases, other information and data, programs or instructions (of the software of the present invention), and other types of tables such as database tables or any other form of data repository.

As indicated above, the processor 405 is hard-wired, configured or programmed, using software and data structures of the invention, for example, to perform any portion of the user-interactive functionality of the present disclosure. As a consequence, the system and method of the present disclosure may be embodied as software which provides such programming or other instructions, such as a set of instructions and/or metadata embodied within a non-transitory computer-readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Javascript, Adobe Flash, Silverlight, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, "software", "program", "computer program", or a "module", "program module", "software module", as used equivalently herein, means and refers to any programming language, of any kind, with any syntax or signatures, which provides or can be interpreted to provide the associated functionality or methodology specified (when instantiated or loaded into a processor or computer and executed, including the processor 405, for example). In addition, any of such program or software modules may be combined or divided in any way. For example, a larger module combining first and second functions is considered equivalent to a first module which performs the first function and a separate second module which performs the second function.

For example, a computer program (e.g., a program, software, software application, script, or code) can be written in any form of programming language, including compiled, interpreted, declarative, or procedural languages. Such a program may be implemented in any form, including as a stand-alone program or as a module, component, subroutine, object, or other construct which may be used in a computing environment, and may be stored as a file, a file system, multiple files, or portion of a file which includes other programs or data, such as a script stored in a markup language document, and may be executed on one or more computers, servers, or other data processing apparatus that are co-located or distributed across multiple locations and interconnected by a network such as the internet.

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 410, e.g., a memory IC, a floppy disk, a CDROM, a CD-RW, a DVD, a magnetic hard drive, an optical drive, or any other type of data storage apparatus or medium, as mentioned above.

Numerous advantages of the present disclosure are readily apparent. The exemplary embodiments provide an interactive, multimedia showroom display for plumbing fixtures and products. Such a display provides comparative ease of use for and interaction with a consumer, provides product information and specifications, and enables a consumer to visualize how a selected plumbing fixture would look and be used in a selected setting, such as the consumer's home.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A display system comprising:
   a display wall having a plurality of slots;
   a plurality of removable shelves, each removable shelf insertable into a slot of the plurality of slots, and each shelf having one or more products affixed thereon;
   a plurality of unique identifiers, each unique identifier coupled to a corresponding removable shelf;
   a fixed shelf having an embedded or attached sensor;
   a processor coupled to the sensor, the processor configured to identify a corresponding product affixed to a selected removable shelf, of the one or more products, when the selected removable shelf is placed in proximity to the fixed shelf; and
   a user-interactive visual display.

2. The display system of claim 1, wherein the one or more products further comprise:
   a plurality of different products, each different product affixed to a different removable shelf of the plurality of removable shelves.

3. The display system of claim 2, wherein each unique identifier corresponds to a selected product of the plurality of products.

4. The display system of claim 2, wherein the plurality of different products is a plurality of different plumbing fixtures.

5. The display system of claim 1, wherein each unique identifier is an RFID tag and the embedded or attached sensor is an RFID sensor.

6. The display system of claim 1, wherein each unique identifier is a bar code or a QR code and the embedded or attached sensor is a bar code reader or a QR code reader.

7. The display system of claim 1, wherein the user-interactive visual display is a touch screen display.

8. The display system of claim 1, wherein each slot is spring-loaded.

9. The display system of claim 1, further comprising:
a memory storing product information; and
wherein the processor is coupled to the memory, the processor further configured to generate data for display on the user-interactive visual display for the corresponding product affixed to the selected removable shelf, the generated data corresponding to a selected unique identifier sensed by the sensor.

10. The display system of claim 9, wherein the generated data is a product specification for the corresponding product.

11. The display system of claim 9, wherein the generated data is a video for the corresponding product.

12. The display system of claim 9, wherein the generated data is a product line for the corresponding product.

13. The display system of claim 9, wherein the generated data is a plurality of finishes for the corresponding product.

14. The display system of claim 9, wherein the generated data is for a visual display showing use of the corresponding product in a selected kitchen or bath environment.

15. The display system of claim 9, further comprising a network input-output interface providing a network coupling for updating the product information stored in the memory.

16. The display system of claim 9, wherein the product information is stored as a database.

17. The display system of claim 1, wherein the plurality of slots have a staggered configuration.

18. The display system of claim 1, further comprising a manufacturer logo floating display.

19. A display system comprising:
a display wall having a plurality of spring-loaded slots;
a plurality of removable shelves, each removable shelf insertable into a slot of the plurality of slots, and each shelf having one or more products affixed thereon;
a plurality of RFID tags, each RFID tag coupled to a corresponding removable shelf;
a fixed shelf having an embedded or attached RFID sensor;
a processor coupled to the RFID sensor, the processor configured to identify a corresponding product affixed to a selected removable shelf, of the one or more products, when the selected removable shelf is placed in proximity to the fixed shelf; and
a user-interactive visual display.

20. A display system comprising:
a display wall having a plurality of spring-loaded slots;
a plurality of removable shelves, each removable shelf insertable into a slot of the plurality of slots, and each shelf having one or more products affixed thereon;
a plurality of RFID tags, each RFID tag coupled to a corresponding removable shelf;
a fixed shelf having an embedded or attached RFID sensor;
a user-interactive visual display;
a memory storing product information; and
a processor coupled to the memory and to the RFID sensor, the processor configured to identify a corresponding product affixed to a selected removable shelf, of the one or more products, when the selected removable shelf is placed in proximity to the fixed shelf, and the processor further configured to generate data for display on the user-interactive visual display for the corresponding product affixed to the selected removable shelf, the generated data corresponding to the RFID tag embedded or attached to the selected removable shelf and sensed by the RFID sensor.

* * * * *